US006984078B2

(12) United States Patent
Inoue et al.

(10) Patent No.: US 6,984,078 B2
(45) Date of Patent: Jan. 10, 2006

(54) APERTURE DIAPHRAGM, IMAGING DEVICE, AND METHOD OF MANUFACTURING THE APERTURE DIAPHRAGM

(75) Inventors: Michio Inoue, Saitama (JP); Makoto Araoka, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 10/682,909

(22) Filed: Oct. 14, 2003

(65) Prior Publication Data

US 2004/0076423 A1 Apr. 22, 2004

(30) Foreign Application Priority Data

Oct. 18, 2002 (JP) ....................................... 2002-304056

(51) Int. Cl.
*G03B 9/06* (2006.01)

(52) U.S. Cl. ........................ 396/510; 348/342; 348/362

(58) Field of Classification Search ................. 396/505, 396/507, 510, 276, 483–485, 488, 458–461; 348/342, 362
See application file for complete search history.

(56) References Cited

U.S. PATENT DOCUMENTS 3,006,265 A * 10/1961 La Rue, Jr. ................. 396/505
4,017,873 A * 4/1977 Shenk et al. .................. 396/66
5,293,542 A * 3/1994 Ise et al. .................... 348/363

FOREIGN PATENT DOCUMENTS

| | | | |
|---|---|---|---|
| JP | 56-012629 | A | 2/1981 |
| JP | 58-012629 | A | 2/1981 |
| JP | 01-252946 | A | 10/1989 |
| JP | 03-266821 | A | 11/1991 |
| JP | 5-281591 | A | 10/1993 |
| JP | 8-043878 | A | 2/1996 |
| JP | 11-52449 | A | 2/1999 |
| JP | 11-167140 | A | 6/1999 |
| JP | 2000-347239 | A | 12/2000 |
| JP | 2002-229095 | A | 8/2002 |

* cited by examiner

*Primary Examiner*—W. B. Perkey
(74) *Attorney, Agent, or Firm*—Foley & Lardner LLP

(57) ABSTRACT

Diaphragm blades move in a direction approaching to or separated from an optical axis of an incident light at the time of operation. Opening edges of the diaphragm blades are provided with neutral density (ND) filters having a predetermined transmittance to pass the incident light. Edges of the ND filters are provided with inclined surfaces having a predetermined angle with respect to the optical axis. With this configuration, flare is suppressed and image quality is enhanced.

38 Claims, 7 Drawing Sheets

APERTURE DIAPHRAGM, IMAGING DEVICE, AND METHOD OF MANUFACTURING THE APERTURE DIAPHRAGM

BACKGROUND OF THE INVENTION

1) Field of the Invention

The present invention relates to a technology on suppressing diffraction effect of an aperture diaphragm and a method of manufacturing the aperture diaphragm.

2) Description of the Related Art

A lens (lens-barrel) of an imaging device such as a video camera is equipped with an aperture diaphragm that has two diaphragm blades each including a recessed notch. A light quantity is adjusted by varying overlapping state between the notches. In a recent video camera, since an imaging device has a high sensitivity, when a picture or image of a subject with a high-intensity is taken, a diameter of a diaphragm opening is reduced. However, if the diaphragm opening is excessively reduced, there is a problem that a diffraction (flare) occurs and resolving power is degraded. In order to reduce an effect of the diffraction, an aperture diaphragm with a neutral density filter (hereinafter, "ND filter") is used. The ND filter is a filter for reducing light transmittance, which is mounted on each diaphragm blade such that the ND filter covers a bottom of the notch (see, for example, Japanese Patent Application Laid Open Publication No. H8-43878).

FIG. 8 is a schematic diagram of a conventional aperture diaphragm having two diaphragm blades. ND filters 53*a* and 53*b* are mounted on diaphragm blades 51*a* and 51*b*, which constitute the aperture diaphragm, respectively. The ND filters 53*a* and 53*b* have various shapes, and an edge that forms the diaphragm opening has a convex arc shape or recessed notch. In order to form the ND filters 53*a* and 53*b* into various shapes, a sheet type material having a thickness of about 0.1 millimeters is cut out by means of die cutting using a die.

It is known that a part that is disposed on a transmission section of an incident light such as the diaphragm blades 51*a* and 51*b*, if the part has a surface in parallel to an optical axis A, causes a flare by light reflection. Even if a width of the parallel surface is about 0.1 millimeter, image quality is degraded.

FIG. 9 is a part of cross section of a lens-barrel illustrating a lens holding structure. A light shielding line 62*a* is formed at edges of a spacer 62, first lens 61*a*, and second lens 61*b* provided in a lens frame 60. Like an example shown in FIG. 9, the light shielding line, i.e., a continuous V-groove having a 0.5 millimeter pitch is formed at the inner diameter of parts that constitute the lens, such as the lens-barrel, the lens frame, and the spacer, which are close to the transmission section of incident light and in parallel to a transmission section, so that a portion which is in parallel to the optical axis is reduced as small as possible to prevent the occurrence of flare.

There is a tendency that thin diaphragm blades are preferably used in order to prevent the occurrence of the flare, and currently diaphragm blades made of carbon steel plates having a thickness of about 0.02 millimeter are used. A technique to remove a surface that is in parallel to the optical axis in such parts constituting the aperture diaphragm is disclosed in, for example, Japanese Patent Application Laid Open Publication No. 2000-347239, Japanese Patent Application Laid Open Publication No. 11-52449, Japanese Patent Application Laid Open Publication No. 11-167140, and Japanese Patent Application Laid Open Publication No. 5-281591.

However, the conventional technology still has the following problems. FIG. 10 is a partially enlarged cross section of the aperture diaphragm illustrated in FIG. 8. As illustrated in FIG. 10, in a configuration in which the ND filters 53*a* and 53*b* are surface-bonded on the diaphragm blades 51*a* and 51*b* in parallel to each other, since end surfaces 55*a* and 55*b* of the ND filters 53*a* and 53*b* are in parallel to the optical axis A and the end surfaces 55*a* and 55*b* exist on the transmission section of the incident light when the lens aperture is small, the image quality is degraded because of the occurrence of the flare.

Generally used commercially available ND filters 53*a* and 53*b* are as thin as about 0.1 millimeter, and it is too thin to form the light shielding line on the edge surface. Therefore, the ND filters 53*a* and 53*b* are conventionally used in a state in which the end surfaces 55*a* and 55*b* are in parallel to the optical axis A, and the problem of the occurrence of flare cannot be solved.

According to a technique described in Japanese Patent Application Laid Open Publication No. 2000-347239, a moving distance of the diaphragm blade becomes long compared with a case in which the diaphragm blade is disposed vertically, and a size of the aperture diaphragm is increased. According to a technique described in Japanese Patent Application Laid Open Publication No. 11-52449, a secondary process, i.e., application of a chemical is required and the manufacturing process becomes complicated. According to a technique described in Japanese Patent Application Laid Open Publication No. 11-167140, since there is a danger that the ND filter comes off from a stopper, it is necessary to assemble the device while preventing the filter from coming off, and it takes time to assemble the device. According to a technique described in Japanese Patent Application Laid Open Publication No. 5-281591, since the ND filter is inclined and thus the diaphragm and the lens must be separated correspondingly, a size of the device in the optical axis direction is increased, which is not desirable in terms of the optical design.

SUMMARY OF THE INVENTION

It is an object of the present invention to solve at least the problems in the conventional technology.

The aperture diaphragm for controlling a size of an aperture for an incident light according to one aspect of the present invention includes at least two diaphragm blades. Each diaphragm blade has an edge towards an optical axis of the incident light, and each edge has a surface that is inclined with respect to the optical axis.

The aperture diaphragm for controlling a size of an aperture for an incident light according to another aspect of the present invention includes at least two diaphragm blades, and an optical filter attached to each diaphragm blade, each optical filter having an edge towards the optical axis, each edge having a surface that is inclined with respect to the optical axis.

The imaging device according to still another aspect of the present invention includes an aperture diaphragm for controlling a size of an aperture for an incident light, the aperture diaphragm including at least two diaphragm blades, each diaphragm blade having a first edge towards an optical axis of the incident light, each first edge having a first surface that is inclined with respect to the optical axis.

The imaging device according to still another aspect of the present invention includes an aperture diaphragm for controlling a size of an aperture for an incident light, the aperture diaphragm including at least two diaphragm blades, and an optical filter attached to each diaphragm blade, each optical filter having an edge towards the optical axis, each edge having a surface that is inclined with respect to the optical axis.

The method of manufacturing an aperture diaphragm for controlling a size of an aperture for an incident light according to still another aspect of the present invention, where the aperture diaphragm including at least two diaphragm blades with a mechanism to move the diaphragm blades towards and away from an optical axis of the incident light, includes machining an inclined surface with a predetermined angle to the optical axis on an edge of an optical filter, the edge being toward the optical axis, and mounting the optical filter on each diaphragm blade in such a way that the optical filter forms a smaller aperture than the diaphragm blades, the inclined surface being directed to the optical axis.

These and other objects, features and advantages of the present invention are specifically set forth in or will become apparent from the following detailed descriptions of the invention when read in conjunction with the accompanying drawings.

DETAILED DESCRIPTION

Exemplary embodiments of an aperture diaphragm, an imaging device and a method for manufacturing the aperture diaphragm according to the present invention will be explained in detail with reference to the accompanying drawings. The aperture diaphragm is used for a lens (lens-barrel) of a digital still camera and a video camera and the like having a charge coupled device (CCD) as an imaging device.

Figure 1:
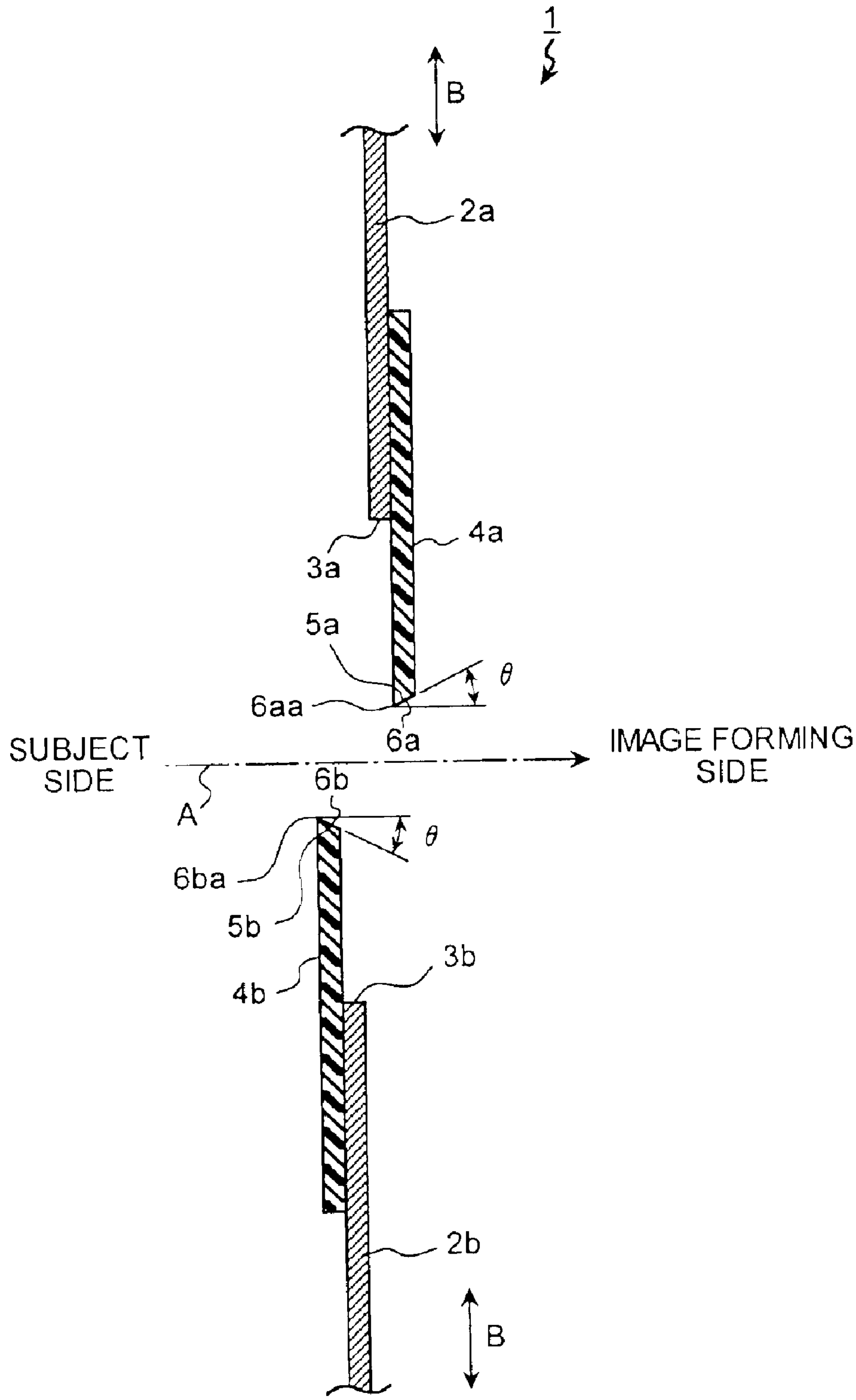
FIG. 1 is a cross section of an aperture diaphragm according to a first embodiment of the present invention.

FIG. 1 is a cross section of an aperture diaphragm according to a first embodiment of the present invention. An aperture diaphragm 1 includes two diaphragm blades 2*a* and 2*b*. Each of the diaphragm blades 2*a* and 2*b* is formed into thin flat plate-like shape as described above. The diaphragm blades 2*a* and 2*b* can reciprocate in a direction (direction B shown in FIG. 1) intersecting with an optical axis A at right angles when an aperture of a lens is controlled. When the aperture of the lens is small, the pair of diaphragm blades 2*a* and 2*b* approach each other to reduce a pass-amount of incident light, and the aperture is opened, the diaphragm blades 2*a* and 2*b* are separated from each other to increase the pass-amount of incident light.

The diaphragm blades 2*a* and 2*b* respectively have opening edges 3*a* and 3*b*. ND filters 4*a* and 4*b* are respectively mounted on the opening edges 3*a* and 3*b* facing the optical axis A. The ND filters 4*a* and 4*b* are also formed into thin and flat plate-like shape as described above, and the filters 4*a* and 4*b* are bonded and fixed to the diaphragm blades 2*a* and 2*b* in a face-to-face manner using adhesive or the like.

The ND filters 4*a* and 4*b* respectively have edges 5*a* and 5*b* facing the optical axis A. The edges 5*a* and 5*b* are formed with inclined surfaces 6*a* and 6*b* which are inclined through a predetermined angle. The inclined surfaces 6*a* and 6*b* are inclined with respect to the optical axis A through an angle $\theta$. This angle $\theta$ is an angle capable of preventing the occurrence of flare. The inclined surfaces 6*a* and 6*b* may not be flat and smooth surfaces.

Figure 2:
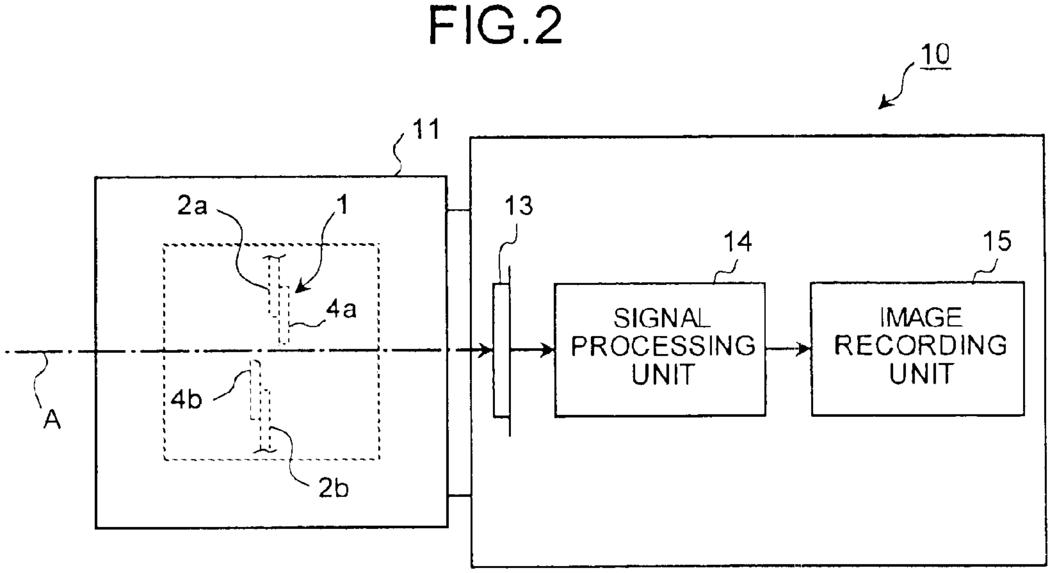
FIG. 2 is a schematic diagram of a video camera equipped with the aperture diaphragm according to the first embodiment.

FIG. 2 is a schematic diagram of a video camera equipped with the aperture diaphragm according to the first embodiment. Optical systems such as the aperture diaphragm 1 and a focus lock mechanism are accommodated in a lens-barrel 11 of a video camera 10. An image of a subject formed by these optical systems is converted into an electric signal by a CCD 13 which is an image pickup device. An output of the CCD 13 is image-developed by a signal processing section 14, and is recorded in an image recording section 15.

When the intensity of the subject is high, an aperture of the aperture diaphragm 1 is reduced, and the diaphragm blades 2*a* and 2*b* move in directions to approach each other. At that time, transmittance of incident light can be reduced by the ND filters 4*a* and 4*b* provided on the diaphragm blades 2*a* and 2*b* to reduce the diffraction phenomenon.

When the aperture is small, incident light passes through the ND filters 4*a* and 4*b*. At that time, since the edges 5*a* and 5*b* of the ND filters 4*a* and 4*b* are formed with the inclined surfaces 6*a* and 6*b* and the inclined surfaces 6*a* and 6*b* are not in parallel to the optical axis A (asymmetric with respect to the straight line of the optical axis A) in FIG. 1, flare can be prevented from occurring. Flare occurs when the aperture is small, but with this configuration, it is possible to prevent resolution from being degraded even when the aperture is small.

According to the first embodiment, in the aperture diaphragm, since the edges 5*a* and 5*b* of the ND filters 4*a* and 4*b* facing the optical axis A are provided with the inclined surfaces 6*a* and 6*b*, no surface which is parallel to the optical axis A is formed, flare which may be caused by light reflection of the edges 5*a* and 5*b* can be prevented from occurring, and the image quality can be improved. Both the diaphragm blades 2*a* and 2*b* and the ND filters 4*a* and 4*b* of the aperture diaphragm 1 are thin and move in a direction intersecting with the optical axis A at right angle. Therefore, the configuration of the device is simple, the size of the device can be reduced, and the device can be designed based on the existing standard size without new constraints of optical design to occur. The ND filters 4*a* and 4*b* can be bonded on the diaphragm blades 2*a* and 2*b* in the face-to-face manner, special machining (bending, adhering and the like) is unnecessary at the time of bonding operation, and no special bonding jig or bonding technique is required.

Figure 3:
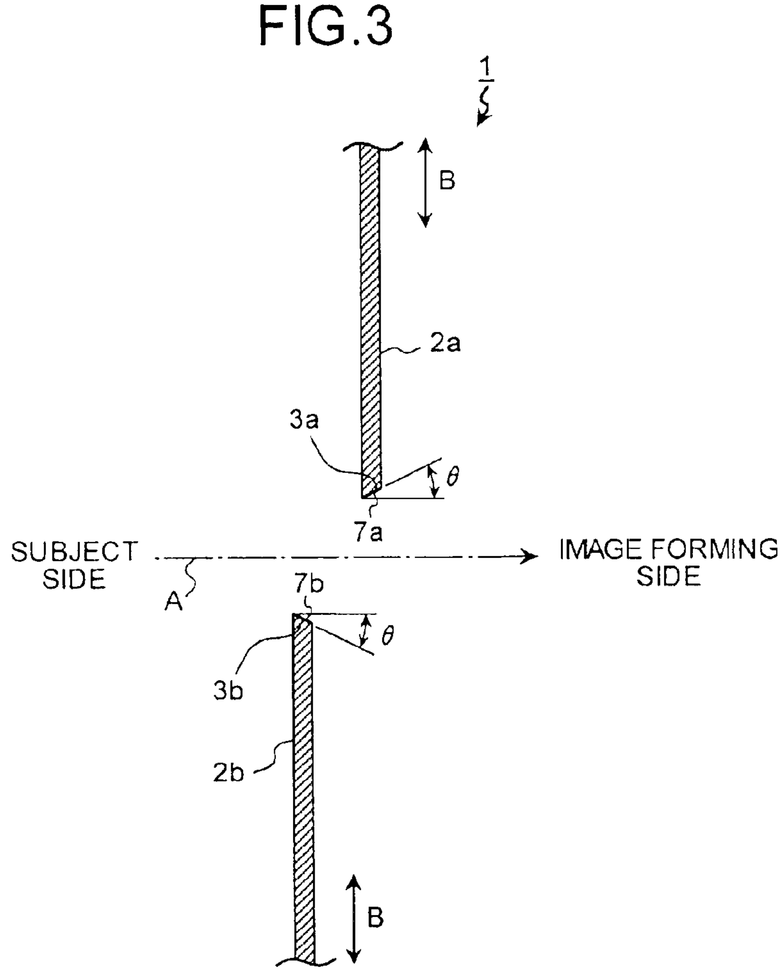
FIG. 3 is a cross section of an aperture diaphragm according to a second embodiment of the present invention.

FIG. 3 is a cross section of an aperture diaphragm according to a second embodiment of the present invention.

In the second embodiment, the diaphragm blades 2*a* and 2*b* are directly provided with inclined surfaces. The aperture diaphragm 1 comprises only the diaphragm blades 2*a* and 2*b* without the ND filters 4*a* and 4*b*. In such a configuration, the opening edges 3*a* and 3*b* of the diaphragm blades 2*a* and 2*b* function as inclined surfaces 7*a* and 7*b*. The inclined surfaces 7*a* and 7*b* are inclined with respect to the optical axis A through the angle θ like the first embodiment.

The aperture can be variable by moving the diaphragm blades 2*a* and 2*b*. Especially when the aperture is small, incident light is shield by the opening edges 3*a* and 3*b* of the diaphragm blades 2*a* and 2*b*. Since the opening edges 3*a* and 3*b* are formed with the inclined surfaces 7*a* and 7*b*, no surface which is in parallel to the optical axis A is formed, and flare can be prevented from occurring.

In the aperture diaphragm of the second embodiment, the opening edges 3*a* and 3*b* of the diaphragm blades 2*a* and 2*b* facing the optical axis A are also provided with the inclined surfaces 7*a* and 7*b*. Therefore, no surface which is in parallel to the optical axis A is formed, the occurrence of flare which may be caused by light reflection of the edges 3*a* and 3*b* can be suppressed, and the image quality can be improved. The diaphragm blades 2*a* and 2*b* of the aperture diaphragm 1 are thin and move in a direction intersecting with the optical axis A at right angles. Therefore, the configuration of the device is simple, the size of the device can be reduced, and new constraints of optical design do not occur.

Figure 4:
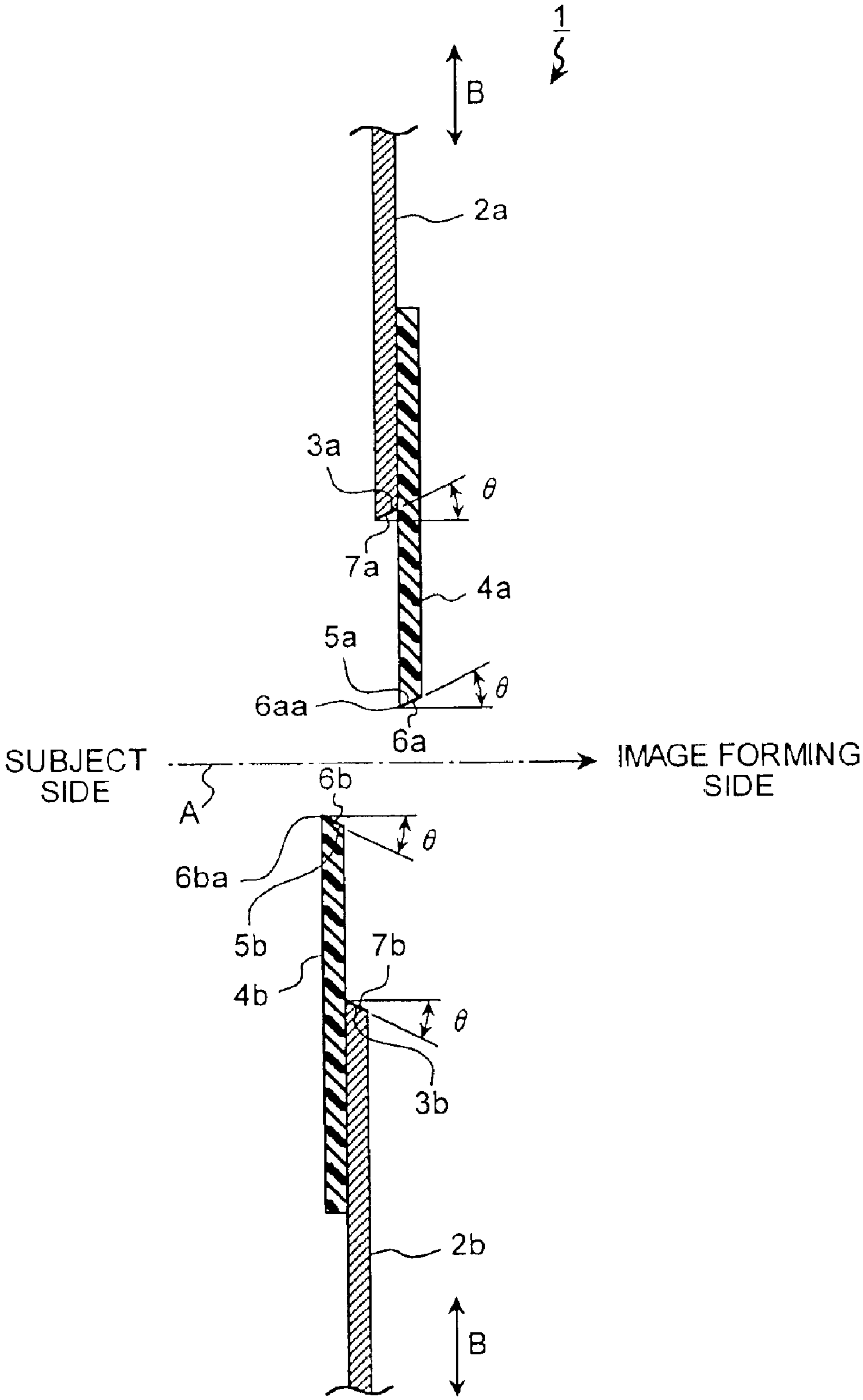
FIG. 4 is a cross section of an aperture diaphragm according to a third embodiment of the present invention.

FIG. 4 is a cross section of an aperture diaphragm according to a third embodiment of the present invention. The third embodiment is a combination of the first embodiment and the second embodiment. As illustrated in FIG. 4, the opening edges 3*a* and 3*b* of the diaphragm blades 2*a* and 2*b* are respectively provided with the inclined surfaces 7*a* and 7*b*. The edges 5*a* and 5*b* of the ND filters 4*a* and 4*b* mounted on the diaphragm blades 2*a* and 2*b* are also provided with the inclined surfaces 6*a* and 6*b*. The inclined surfaces 6*a* and 6*b* and the inclined surfaces 7*a* and 7*b* have an angle θ with respect to the optical axis A like the first embodiment.

With the above configuration, when the aperture is small, flare is prevented from occurring in light which passes through the ND filters 4*a* and 4*b*. When the aperture is intermediate in size, or when incident light is shielded by the opening edges 3*a* and 3*b* of the diaphragm blades 2*a* and 2*b*, flare is prevented from being occurred by the inclined surfaces 7*a* and 7*b* provided on the opening edges 3*a* and 3*b*. Therefore, it is possible to efficiently prevent flare in a predetermined range of the diaphragm opening (especially small aperture and intermediate aperture) of the aperture diaphragm.

According to the aperture diaphragm of the third embodiment, the edges 5*a* and 5*b* of the ND filters 4*a* and 4*b* facing the optical axis A are provided with the inclined surfaces 6*a* and 6*b*, and the opening edges 3*a* and 3*b* of the diaphragm blades 2*a* and 2*b* are provided with the inclined surfaces 7*a* and 7*b*. With this configuration, no surface which is parallel to the optical axis A is formed, flare which may be caused by light reflection of the edges 5*a* and 5*b* of the ND filters 4*a* and 4*b* and the opening edges 3*a* and 3*b* of the diaphragm blades 2*a* and 2*b* can be prevented from occurring, and the image quality can be improved. Both the diaphragm blades 2*a* and 2*b* and the ND filters 4*a* and 4*b* of the aperture diaphragm 1 are thin and move in a direction intersecting with the optical axis A at right angle. Therefore, the configuration of the device is simple, the size of the device can be reduced, and the device can be designed based on the existing standard size without any new constraints of optical design to occur. The ND filters 4*a* and 4*b* can be bonded on the diaphragm blades 2*a* and 2*b* in the face-to-face manner, special machining (bending, adhering and the like) is unnecessary at the time of bonding operation, and no special bonding jig or bonding technique is required.

In each of the embodiments, the ND filters 4*a* and 4*b* are used as the optical filters, and the ND filters 4*a* and 4*b* are provided with the inclined surfaces 6*a* and 6*b*. The inclined surfaces 6*a* and 6*b* need not be provided on the ND filters 4*a* and 4*b*, and the inclined surfaces 6*a* and 6*b* may be provided on other optical filters such as spot filters, infrared rays cut filters, and it is possible to prevent the flare from occurring and to obtain the image quality improving effect.

Figure 5:
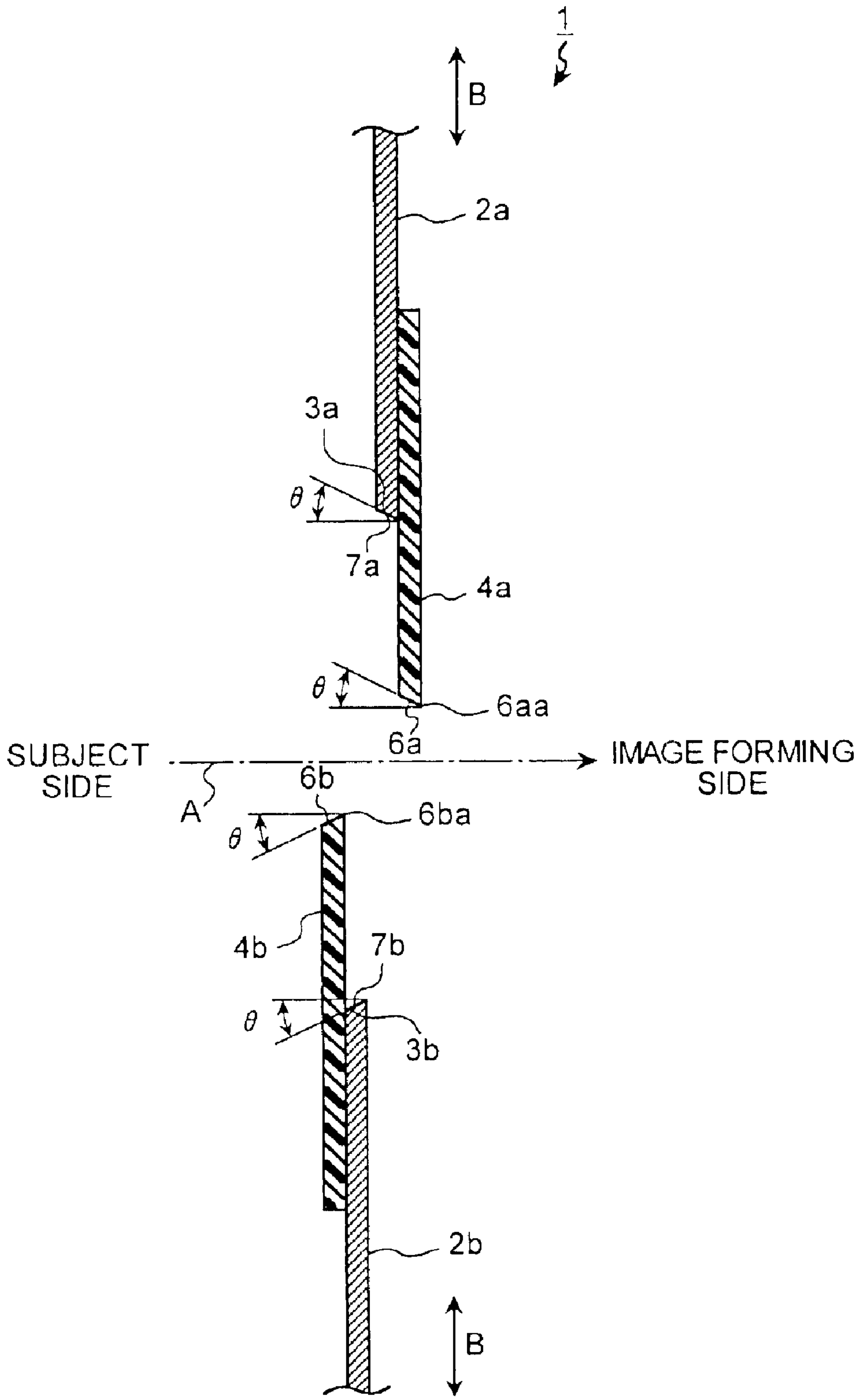
FIG. 5 is a cross section of another example of the aperture diaphragm according to the present invention.

In each of the embodiments, acute apexes 6*aa* and 6*ba* of the inclined surfaces 6*a* and 6*b* may be located closer to the subject (forward) as viewed from incident light direction (see FIG. 1), or may be located closer to an image-forming side (rearward) as in another example of configuration illustrated in FIG. 5. In any cases, flare can be prevented from occurring and the image quality can be improved.

Figure 6:
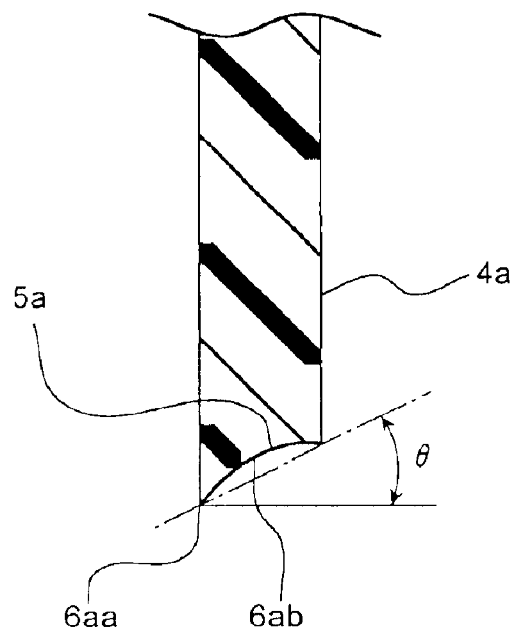
FIG. 6 is a partially enlarged view of a modification of an inclined surface.
Figure 7:
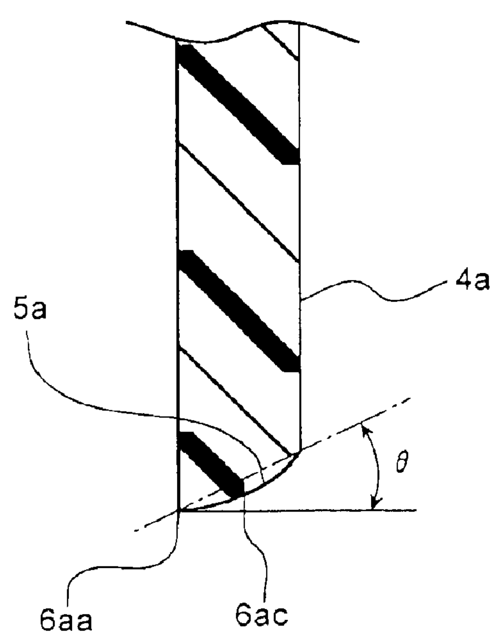
FIG. 7 is a partially enlarged view of another modification of the inclined surface.
Figure 8:
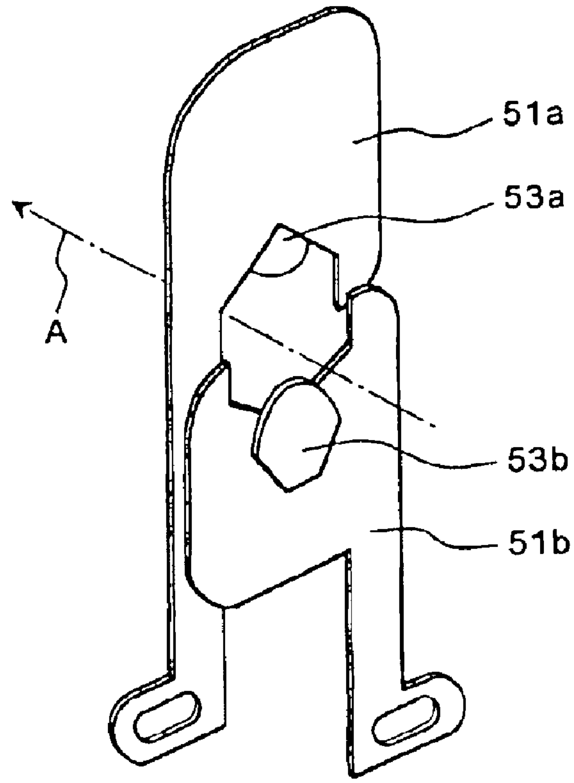
FIG. 8 is a schematic diagram of a conventional aperture diaphragm.
Figure 9:
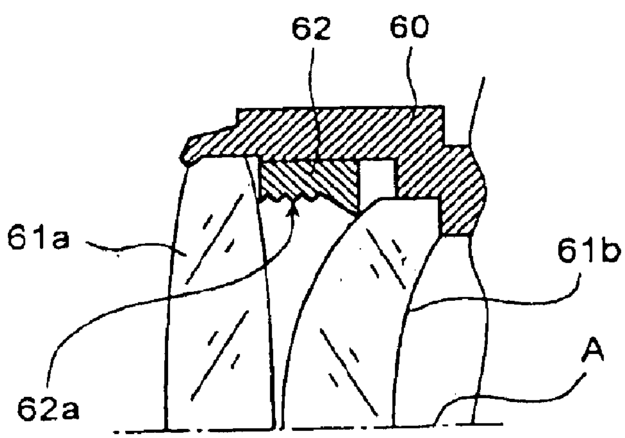
FIG. 9 is a part of cross section of a lens-barrel illustrating a lens holding structure.
Figure 10:
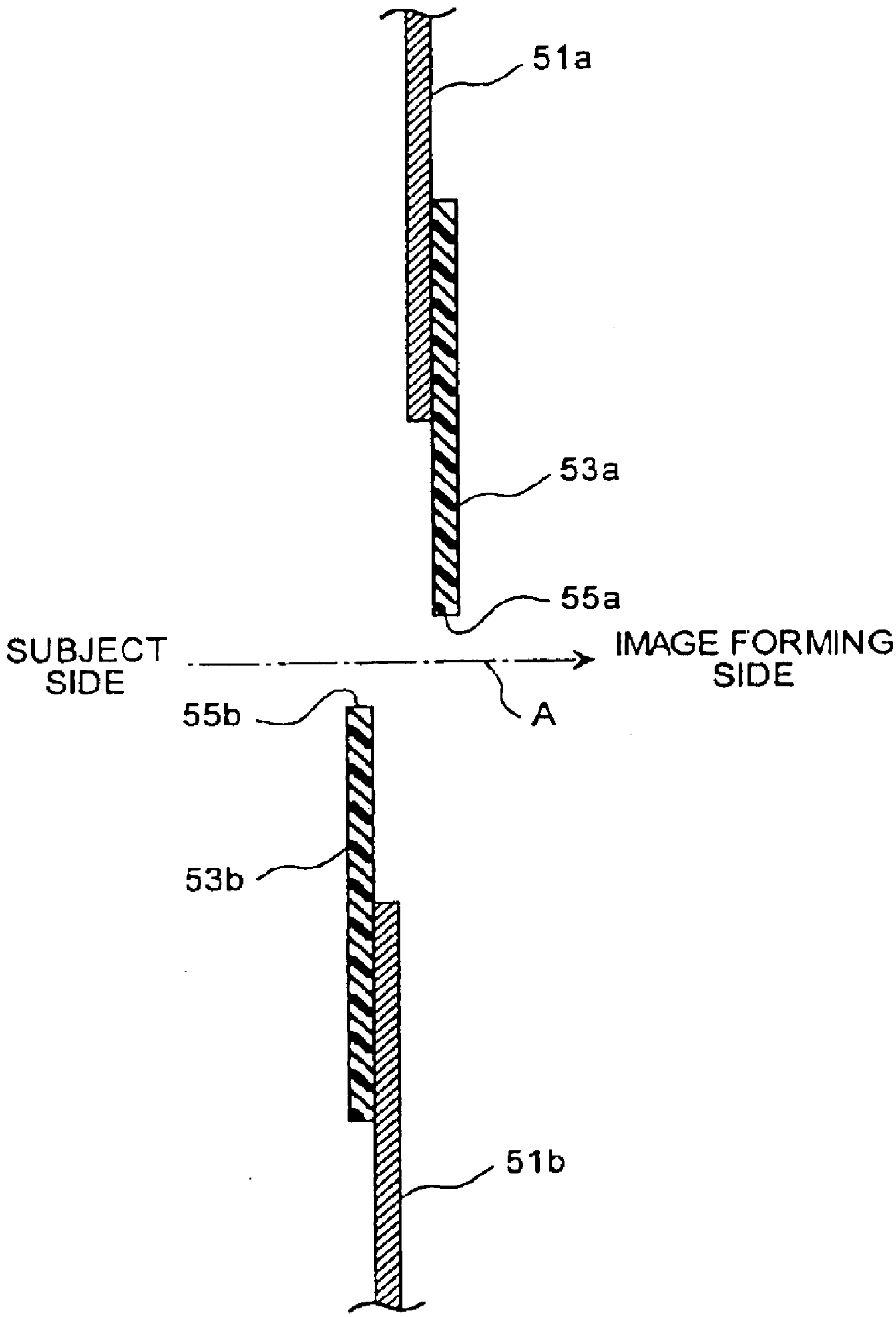
FIG. 10 is a partially enlarged cross section of the conventional aperture diaphragm.

FIG. 6 and FIG. 7 are partially enlarged views illustrating modifications of configuration of the inclined surfaces 6*a* and 6*b*. FIG. 6 illustrates an example in which the inclined surface 6*a* is not flat and smooth but is a recessed curved surface 6*ab*. More specifically, the edge 5*a* of the ND filter 4*a* has a recessed curved surface 6*ab* having a predetermined curvature with respect to the inclined surface 6*a*. FIG. 7 illustrates an example in which the inclined surface 6*a* is formed with a projecting curved surface 6*ac* having a predetermined curvature. The other ND filter 4*b* is formed with a recessed or projecting curved surface with respect to the inclined surface 6*b*. By forming the recessed or projecting curved surfaces on the end of the ND filters 4*a* and 4*b*, flare can be prevented from occurring in the same manner.

As a result of experiments carried out by the present inventors, if the acute apexes 6*aa* and 6*ba* of the inclined surfaces 6*a* and 6*b* are located closer to the subject as illustrated in FIG. 1, the image quality improving effect was higher. When a pair of diaphragm blades is used, the acute apexes 6*aa* and 6*ba* of the inclined surfaces 6*a* and 6*b* formed on the ND filters 4*a* and 4*b* may be directed forward, rearward, or in the same direction or different directions from each other. The inclined surfaces 7*a* and 7*b* of the diaphragm blades 2*a* and 2*b* can be modified as in the same manner as the above-explained modifications concerning the inclination direction of the inclined surfaces 6*a* and 6*b* of the ND filters 4*a* and 4*b* and the curved surfaces.

The aperture diaphragm explained in each of the embodiments has the pair of diaphragm blades 2*a* and 2*b*, but the invention is not limited to this configuration, and three or more diaphragm blades may approach the optical axis or separated from the optical axis. In this case, the ND filters may be combined such that a position of the acute apex of the inclined surface of each blade may be different. For example, in a aperture diaphragm in which a plurality of aperture diaphragms are arranged annularly, acute apexes of adjacent ND filters may be alternately disposed forward and rearward.

For forming inclined surfaces 6*a* and 6*b* on the ND filters 4*a* and 4*b*, the following methods were attempted: 1) a method for applying acetone on the edges 5*a* and 5*b* of the ND filters 4*a* and 4*b*, the acetone was dissolved and formed; 2) a method for shaving the edges 5*a* and 5*b* of the ND filters 4*a* and 4*b* using a file; and 3) a method for die cutting using a die. It was confirmed that the flare could be prevented from being occurred by any of these methods. By forming the inclined surfaces 6*a* and 6*b* having the predetermined angle θ on the ND filters 4*a* and 4*b* using various machining methods, it is possible to prevent flare from occurring and to enhance the image quality. The third method for die cutting using a die has the highest productivity per time.

As a result of experiments carried out by the inventors, if the angle θ of the inclined surface 6*a*, 6*b* was in a range of about 10 to 15 degrees, the flare-reducing effect was obtained. If the angle θ was smaller than 10 degrees, the flare-reducing effect could not be obtained almost at all. The reason why the maximum value of the angle θ was set to 15 degrees is that a constraint of the maximum angle of the die cutting using the die is about 15 degrees under the present circumstances.

The aperture diaphragm in which the filters or the diaphragm blades provided with the inclined surfaces can be applied to an imaging device such as a digital still camera or the video camera 10 having an image pickup device such as a small CCD, and can also be applied to a silver-salt camera, and it is possible to prevent flare from occurring and to enhance the image quality.

As explained above, according to the aperture diaphragm of the invention, there is an effect that flare is prevented from being occurred by a simple configuration of the diaphragm blades or optical filters, and the image quality can be enhanced. According to the imaging device of the invention, there is an effect that flare is prevented from occurring and the image quality is prevented from being degraded while increasing the optical system and the entire device in size and preventing flare from occurring. According to the producing method of the aperture diaphragm of the invention, there is an effect that it is possible to reduce, in size, an aperture diaphragm capable of preventing flare from occurring, and it is easy to produce the aperture diaphragm.

The present document incorporates by reference the entire contents of Japanese priority document, 2002-304056 filed in Japan on Oct. 18, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An aperture diaphragm for controlling a size of an aperture for an incident light, comprising:

at least two diaphragm blades, each diaphragm blade having a first edge towards an optical axis of the incident light, each first edge having a first surface that is inclined with respect to the optical axis; and at least two optical filters, each optical filter having a second edge towards the optical axis, each second edge having a second surface that is inclined with respect to the optical axis.

2. The aperture diaphragm according to claim 1, wherein the optical filters are arranged perpendicular to the optical axis.

3. The aperture diaphragm according to claim 1, wherein the second surface makes an angle of 10 to 15 degrees to the optical axis.

4. The aperture diaphragm according to claim 1, wherein the second surface is concave.

5. The aperture diaphragm according to claim 1, wherein the second surface is convex.

6. The aperture diaphragm according to claim 1, wherein acute apexes, formed due to inclination of the second surface, of the edges are positioned toward a subject side.

7. The aperture diaphragm according to claim 1, wherein acute apexes, formed due to inclination of the second surface, of the edges are positioned toward an image forming side.

8. The aperture diaphragm according to claim 1, wherein acute apexes, formed due to inclination of the second surface, of the edges are arranged in a combination of a direction towards a subject side and a direction towards an image forming side.

9. The aperture diaphragm according to claim 1, wherein the diaphragm blades and the optical filters are plate-shaped, and each of the diaphragm blades is surface-bonded with a corresponding optical filter.

10. The aperture diaphragm according to claim 1, further comprising a mechanism that moves the diaphragm blades towards and away from the optical axis.

11. The aperture diaphragm according to claim 1, wherein the optical filter is a neutral density filter.

12. An aperture diaphragm fro controlling a size of an aperture for an incident light, comprising:

at least two diaphragm blades; and an optical filter attached to each diaphragm blade, each optical filter having an edge towards the optical axis, each edge having a surface that is inclined with respect to the optical axis.

13. The aperture diaphragm according to claim 12, wherein the diaphragm blades are arranged perpendicular to the optical axis.

14. The aperture diaphragm according to claim 12, wherein the optical filters are arranged perpendicular to the optical axis.

15. The aperture diaphragm according to claim 12, wherein the surface makes an angle of 10 to 15 degrees to the optical axis.

16. The aperture diaphragm according to claim 12, wherein the surface concave.

17. The aperture diaphragm according to claim 12, wherein the surface convex.

18. The aperture diaphragm according to claim 12, wherein acute apexes, formed due to the inclination of the surface, of the edges are positioned toward a subject side.

19. The aperture diaphragm according to claim 12, wherein acute apexes, formed due to inclination of the surface, of the edges are positioned toward an image forming side.

20. The aperture diaphragm according to claim 12, wherein acute apexes, formed due to inclination of the surface, of the edges are arranged in a combination of a direction towards a subject side and a direction towards an image forming side.

21. The aperture diaphragm according to claim 12, wherein the diaphragm blades and the optical filters are plate-shaped, and each of the diaphragm blades is surface-bonded with a corresponding optical filter.

22. The aperture diaphragm according to claim 12, further comprising a mechanism that moves the diaphragm blades towards and away from the optical axis.

23. The aperture diaphragm according to claim 12, wherein the optical filter is a neutral density filter.

24. An imaging device comprising:

an aperture diaphragm for controlling a size of an aperture for an incident light, the aperture diaphragm including:

at least two diaphragm blades, each diaphragm blade having a first edge towards an optical axis of the incident light, each first edge having a first surface that is inclined with respect to the optical axis, wherein the aperture diaphragm further includes at least two optical filters, each optical filter having a second edge towards the optical axis, each second edge having a second surface that is inclined with respect to the optical axis.

25. An imaging device comprising:

an aperture diaphragm for controlling a size of an aperture for an incident light, the aperture diaphragm including at least two diaphragm blades; and an optical filter attached to each diaphragm blade, each optical filter having an edge towards the optical axis, each edge having a surface that is inclined with respect to the optical axis.

26. A method of manufacturing an aperture diaphragm for controlling a size of an aperture for an incident light, the aperture diaphragm including at least two diaphragm blades with a mechanism to move the diaphragm blades towards and away from an optical axis of the incident light, the method comprising:

machining an inclined surface with a predetermined angle to the optical axis on an edge of an optical filter, the edge being toward the optical axis; and mounting the optical filter on each diaphragm blade in such a way that the optical filter forms a smaller aperture than the diaphragm blades, the inclined surface being directed to the optical axis.

27. The method according to claim 26, wherein the machining is performed by cutting.

28. The method according to claim 26, wherein the inclined surface makes an angle of 10 to 15 degrees to the optical axis.

29. The aperture diaphragm according to claim 1, wherein the diaphragm blades are arranged perpendicular to the optical axis.

30. The aperture diaphragm according to claim 1, wherein the first surface makes an angle of 10 to 15 degrees to the optical axis.

31. The aperture diaphragm according to claim 1, wherein the first surface is concave.

32. The aperture diaphragm according to claim 1, wherein the first surface is convex.

33. The aperture diaphragm according to claim 1, wherein acute apexes, formed due to inclination of the first surface of the edges, are positioned toward a subject side.

34. The aperture diaphragm according to claim 1, wherein acute apexes, formed due to inclination of the first surface of the edges, are positioned toward an image forming side.

35. The aperture diaphragm according to claim 1, wherein acute apexes, formed due to inclination of the first surface of the edges, are arranged in a combination of a direction towards a subject side and a direction towards an image forming side.

36. A method of manufacturing an aperture diaphragm having at least two diaphragm blades which are movable in a direction approaching to or receding from a light axis of an incident light, and at least two optical filters which vary transmittance of the incident light, the method including:

a first step of forming a first inclined surface at a first edge to face the light axis for each of the diaphragm blades, such that the first inclined surface has a predetermined first angle with respect to the light axis;

a second step of forming a second inclined surface at a second edge to face the optical axis for each of the optical filters, such that the second inclined surface has a predetermined second angle with respect to the light axis; and an assembly step of mounting each of the optical filters on each of the diaphragm blades such that each of the optical filters is fixed adjacent the first edge of each of the diaphragm blades with the second inclined surface facing the optical axis.

37. The method of manufacturing an aperture diaphragm according to claim 36, wherein the first inclined surface and the second inclined surface are formed by die cutting using a die in the first step and in the second step respectively.

38. The method of manufacturing an aperture diaphragm according to claim 37, wherein the first angle and the second angle range from about 10 degrees to 15 degrees with respect to an angle perpendicular to a surface of each of the diaphragm blades and with respect to an angle perpendicular to a surface of each of the optical filters, respectively.

* * * * *